US012551739B2

(12) United States Patent
Peoples

(10) Patent No.: US 12,551,739 B2
(45) Date of Patent: Feb. 17, 2026

(54) ICE SLURRY FIREFIGHTING SYSTEM

(71) Applicant: Herman Peoples, Longwood, FL (US)

(72) Inventor: Herman Peoples, Longwood, FL (US)

( * ) Notice: Subject to any disclaimer, the term of this patent is extended or adjusted under 35 U.S.C. 154(b) by 0 days.

(21) Appl. No.: 18/945,305

(22) Filed: Nov. 12, 2024

(65) Prior Publication Data

US 2025/0152981 A1 May 15, 2025

Related U.S. Application Data

(60) Provisional application No. 63/598,343, filed on Nov. 13, 2023.

(51) Int. Cl.
*A62C 5/00* (2006.01)
*A62C 31/00* (2006.01)

(52) U.S. Cl.
CPC ............ *A62C 5/002* (2013.01); *A62C 31/005* (2013.01)

(58) Field of Classification Search
CPC ......... A62C 5/00; A62C 5/002; A62C 31/005; A62C 27/00; A62C 5/02; B05B 9/002
See application file for complete search history.

(56) References Cited

U.S. PATENT DOCUMENTS 3,974,879 A * 8/1976 Nelson, Jr. ............. A62C 27/00 417/28

FOREIGN PATENT DOCUMENTS

| | | | | |
|---|---|---|---|---|
| CN | 102940944 | A | * | 2/2013 |
| CN | 205108842 | U | * | 3/2016 |
| CN | 107626065 | A | * | 1/2018 |
| CN | 113357857 | A | * | 9/2021 |

* cited by examiner

*Primary Examiner* — Steven M Sutherland
(74) *Attorney, Agent, or Firm* — Jason T. Daniel, Esq.; Daniel Law Offices, P.A.

(57) ABSTRACT

An ice slurry firefighting system includes a water tank for receiving and storing water from a water source. A water pump is connected to the tank and pumps water to a valve. The valve selectively directs the pumped water to one or both of a slurry generation unit and a pump panel. The slurry generation unit includes a condenser, an evaporator, and a compressor that remove heat from water supplied by the tank passing over evaporator coils to produce an ice slurry mixture. The pump panel houses a system controller and a valve tap for engaging a fire hose and nozzle. The system controller operates the pump, the valve, the slurry generation unit, and a ratio control valve to dispense any ratio of water and ice slurry through the hose and nozzle. A generator provides power to the system components.

15 Claims, 4 Drawing Sheets

ICE SLURRY FIREFIGHTING SYSTEM

CROSS-REFERENCE TO RELATED APPLICATIONS

This application claims the benefit of U.S. Application Ser. No. 63/598,343 filed on Nov. 13, 2023, the contents of which are incorporated herein by reference.

TECHNICAL FIELD

The present invention relates generally to firefighting systems, and more particularly to a system for generating ice slurry for use in firefighting systems.

BACKGROUND

The statements in this section merely provide background information related to the present disclosure and may not constitute prior art.

Modern firefighting vehicles must be equipped to allow firefighters to battle a wide range of fires and hazardous conditions. Most typical fire engines carry several hundred gallons of water onboard and are able to connect to onsite water sources such as fire hydrants, for example when battling fires in urban areas. However, some of the worst and most difficult fires to extinguish occur in remote, rugged areas where water for dousing the fire might be in short supply. To make matters worse, because many of these areas are covered with vegetation and trees, there is ample fuel for the fire to expand and grow.

Although there are many known types of specialized fire truck pumpers which carry large supplies of water to remote locations, firefighters must use the available water sparingly to ensure they do not run out. As such, many remote fires are fought by creating firebreaks in the path of the fire to starve the fire from fuel and thus allow it to burn itself out without spreading. In this regard, creating a firebreak typically involves utilizing earth-moving equipment to remove vegetation and/or to thoroughly douse any remaining vegetation with water.

Unfortunately, earth-moving equipment is not always available, so the success or failure of the firebreak relies on the ability to saturate the vegetation with water to prevent it from catching fire. However, with limited water supply, this can be a difficult process, and often times the heat from the approaching fire will burn off the water before the fire reaches the vegetation.

With the above factors in mind, it would be beneficial to provide an ice slurry firefighting system that can create and dispense a slurry of ice and water so as to greatly increase the effectiveness of available water supplies to withstand heat and extinguish fire when used both as a firebreaks or in traditional firefighting water extinguishment situations.

SUMMARY OF THE INVENTION

The present invention is directed to an ice slurry firefighting system. One embodiment of the present invention can include a water tank for receiving and storing water from a water source. A water pump can be connected to the tank and can pump water to a valve. The valve is connected to a system controller and can direct the pumped water to one or both of a slurry generation unit and a pump panel.

The slurry generation unit can include a condenser, an evaporator, and a compressor that function to remove heat from the water supplied by the tank. The removal of the heat produces ice which blends with the water to form a slurry mixture. The slurry mixture can be stored in an insulated slurry tank that is connected to a slurry pump.

The pump panel can house the system controller, and a valve tap for engaging a fire hose and nozzle. The system controller can control the operation of the pump, the valve, the slurry generation unit, and a ratio control valve to dispense any ratio of water and ice slurry from the system via the hose and nozzle. The system can also include a generator for providing power to the system components.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
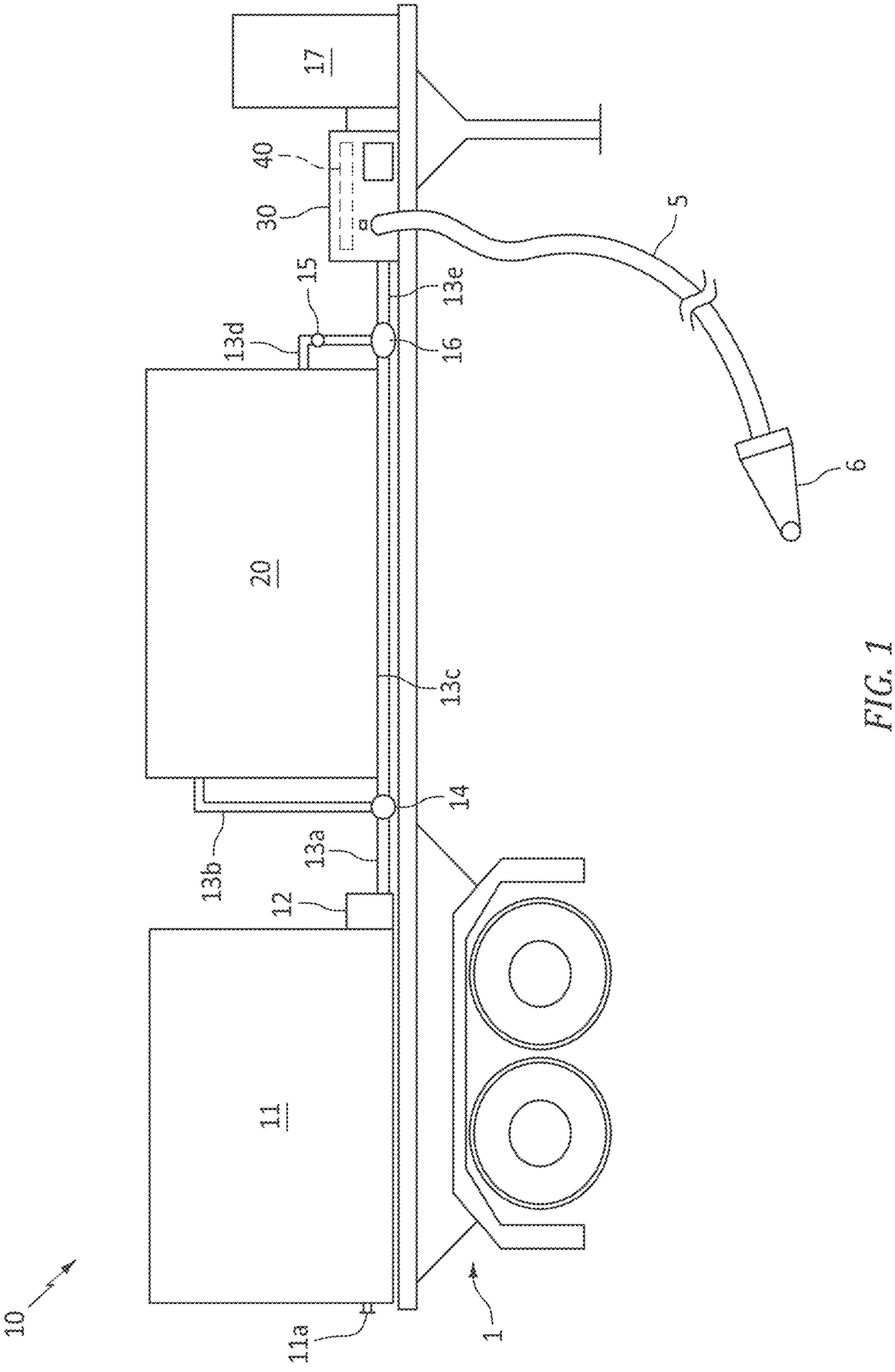
FIG. 1 is a side view of an ice slurry firefighting system in accordance with one embodiment of the invention.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

As described herein, a “unit” means a series of identified physical components which are linked together and/or function together to perform a specified function.

FIGS. 1-4 illustrate one embodiment of an ice slurry firefighting system 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms “upper,” “bottom,” “right,” “left,” “front,” “vertical,” “horizontal,” and derivatives thereof shall relate to the invention as oriented in FIG. 1.

The ice slurry firefighting system 10 can function to generate ice slurry to be dispensed by firefighters utilizing hose mounted nozzles while battling fires or creating firebreaks, for example. Although illustrated below with the system components mounted onto a trailer 1, this is but one possible implementation of the system. In this regard, the system components may be incorporated into the design of a traditional fire engine so as to utilize the onboard pumps, motor, and fluid tank of the engine. Additionally, smaller modular versions of the inventive system are contemplated which can be palletized and air dropped to hotspot locations around the world for use by firefighters battling wildfires in remote locations.

One embodiment of the ice slurry firefighting system 10 can include a water source such as the tank 11 illustrated at FIG. 1. The water tank can be constructed from any number of different materials such as various metals or plastics, for example, and can include any number of different shapes and sizes. The water tank can include any number of access points 11*a* for receiving water into the tank body as are known in the art.

A water pump 12 is connected to the output of the tank 11 and can function to supply water from the tank to the slurry generation unit 20 and the pump panel 30. In the illustrated embodiment the water pump 12 can include an electric pump that is powered by an onboard power generator 17 and controlled by the system controller 40. The water pump can include any number of different types of pumps and can operate at any number of different pressures and water volume settings.

A pipe 13*a* connects the output of the pump 12 to a water supply valve 14, which functions to selectively send water to each of the slurry generation unit 20 and the pump panel 30 via pipes 13*b* and 13*c*, respectively. In one embodiment, the valve is an electric valve that is connected to the system controller 40, and functions to send measured amounts of water to the slurry generation unit 10 based on the desired output volume and slurry consistency settings for the slurry generation unit. In this regard, the control panel can operate the valve based on water resource requests by the slurry generation unit itself, or in a manual mode based on user settings. As such, a user can choose to bypass the slurry generation unit entirely when only water is needed to be dispensed from the pump panel.

Figure 2:
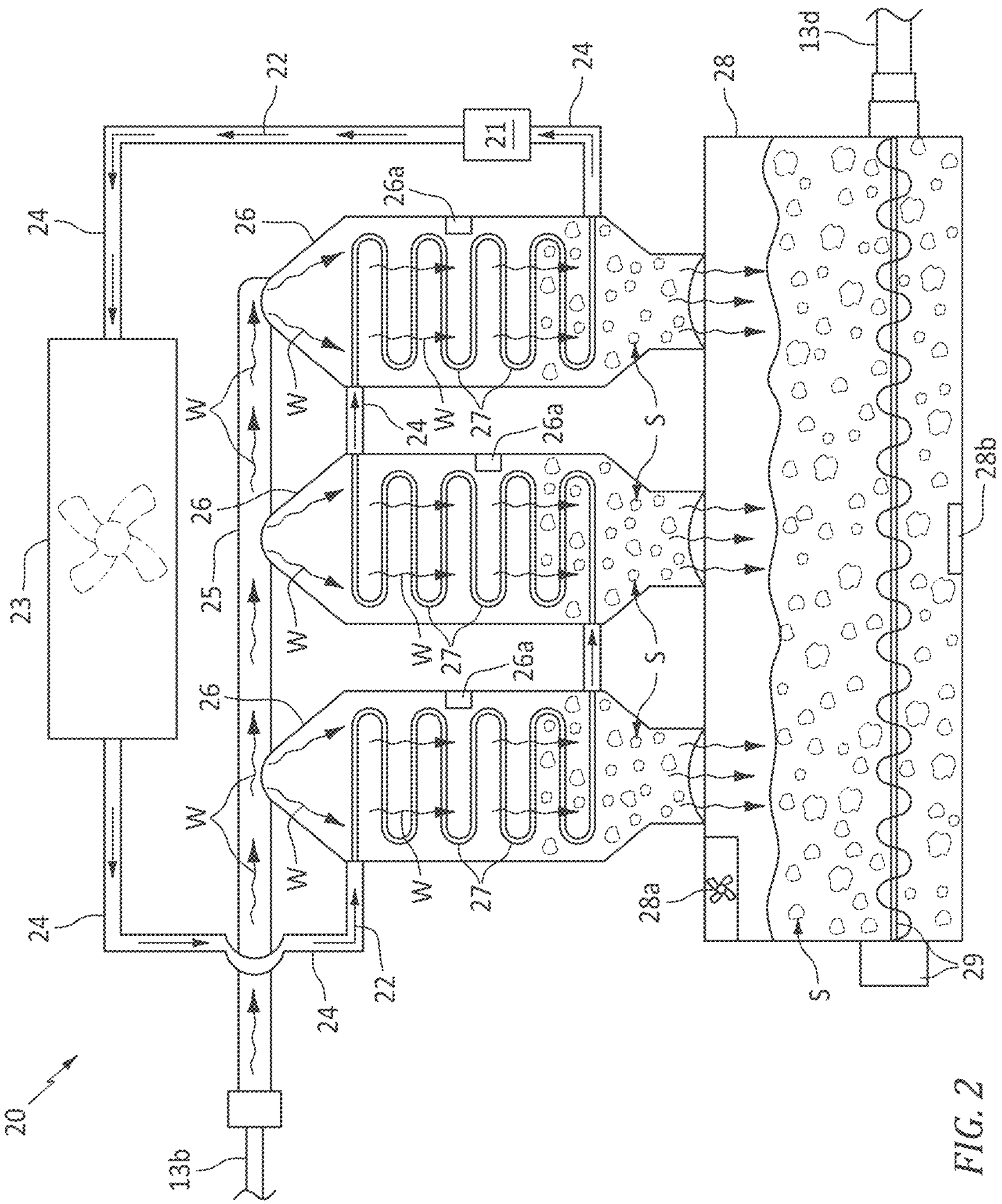
FIG. 2 is a front view of the slurry generation unit of the system, in accordance with one embodiment of the invention.

The slurry generation unit 20 functions as a thermal energy conversion system that generates ice slurry on demand. As shown at FIG. 2, one embodiment of the slurry generation unit 20 can include a compressor 21 that acts as a pump for compressing and circulating a refrigerant 22 through a condenser 23 and a plurality of evaporator coils 27 via a circulation chamber. In the preferred embodiment, the circulation chamber will include a plurality of copper tubes 24, and the refrigerant will comprise a pressurized gas such as C02 or Freon®, for example.

As is known, the condenser 23 includes a plurality of internally located condenser coils that are connected to the circulation chamber. A fan is provided on the condenser and blows air over the condenser coils to remove heat from the coils to the outside environment. Although not illustrated, a thermostatic expansion valve and/or volume valve may also be provided to control the refrigerant flow. The condenser and compressor receive power from the onboard generator 17 and are connected to the controller 40 to receive operating instructions therefrom.

In one embodiment, a water supply line 25 is connected to the pipe 13*b* for receiving water W from the pump 12. The supply line can be connected to one or more fluid chambers 26, each having a plurality of evaporator coils 27 located therein. Each of the coils including a large surface area over which water W can pass as it moves through the chamber(s) 26. During this time, heat in the water is absorbed by refrigerant 22 passing through the circulation chamber 24. This process forms ice crystals in the water which results in a slurry S containing ice and water that empties from the bottom of the chamber(s) 26 into the slurry tank 28.

The slurry tank 28 can include any number of different shapes and sizes and will ideally be insulated so as to keep the slurry at a cold temperature, thus maintaining the desired consistency of ice and water. In one embodiment, the tank can include a dedicated refrigeration unit having a condenser, compressor, circulation system and internally located evaporator unit 28*a*. Alternatively, the evaporator unit 28*a* may be connected to the above noted compressor 21 and condenser 23 via the circulation chamber 21.

In one embodiment, a slurry pump 29 such as the illustrated screw pump, for example can be positioned within the tank 28. The slurry pump 29 receives power from the onboard gas generator 17 and is connected to the controller 40. Based on instructions from the controller, the pump 29 selectively pumps the slurry S from the tank 28 to the pump panel 30 via pipes 13*d* and 13*e*, respectively.

As noted above, the supply of water to the slurry generation unit is controlled by the valve 14 based on a command from the controller 40. In one embodiment, fluid sensors 26*a* and 28*b* within the tank and slurry generation unit, respectively, notify the controller 40 when more or less water is needed in order to provide consistent slurry production and/or to achieve a particular slurry consistency. As described herein, sensors 26*a* and 28*a* can include any type or number of sensors capable of detecting the amount, flow, or volume of a fluid, such as capacitive sensors, float level sensors or ultrasonic/radar level sensors, among others, for example.

Although described above with regard to specific components for forming the slurry, those of skill in the art will recognize that other types of thermal energy conversion systems and related components capable of creating ice in any number of different shapes, sizes, and slurry consistency levels may also be utilized in conjunction with or in place of one or more of the noted components without undue experimentation.

Returning to FIG. 1, the slurry that is output from the slurry generation unit 20 can be pumped through pipe 13*d* and a check valve 15 before connecting to a ratio control valve 16. The ratio control valve is connected to the controller 40 and functions to dispense a specific ratio of water and slurry from pipes 13*c* and 13*d*, respectively to the pump panel 30 via pipe 13*e*.

Figure 3:
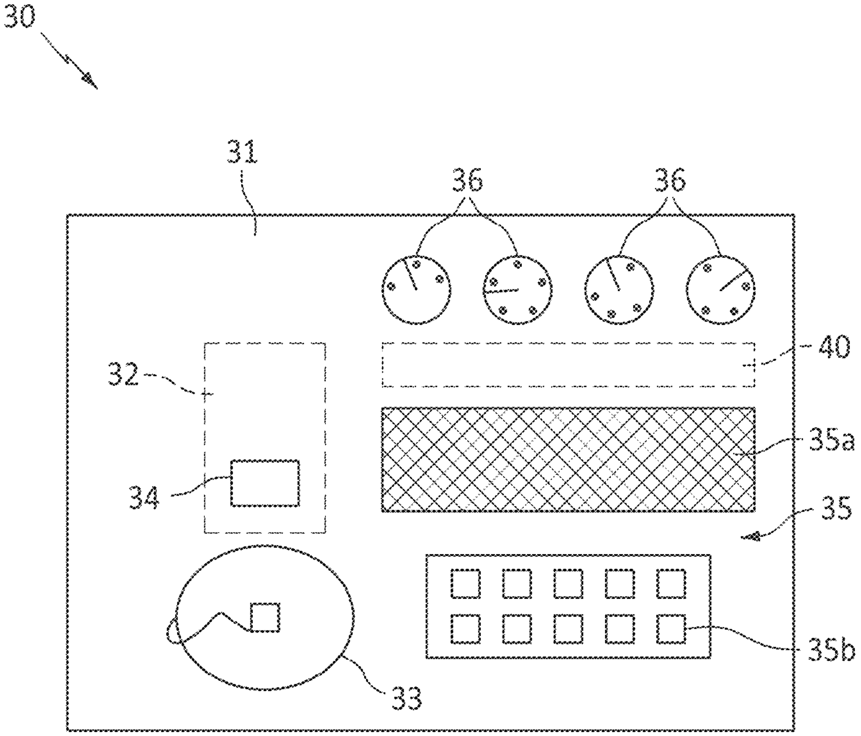
FIG. 3 is a front view of the pump panel of the system, in accordance with one embodiment of the invention.

As shown at FIG. 3, the pump panel 30 can function as the command center for the system 10. The panel can include a main body console 31 having a valve 32 that connects to the pipe 13*e*. A valve tap 33 is connected to the valve 32 into which the fire hose 5 and nozzle 6 of FIG. 1 can be connected. The valve is operated by a physical actuator 34 such as a wheel or lever, for example to selectively open and close the valve to dispense water and/or slurry from the system. The pump panel can house a system controller 40 for controlling the operation of the electronic components of the system, and a user interface 35 having one or more display screens 35*a*, and/or push button type controls 35*b* for sending or receiving information to/from the controller. Additionally, any number of different gauges 36 can be provided for displaying information such as tank levels, for example.

Figure 4:
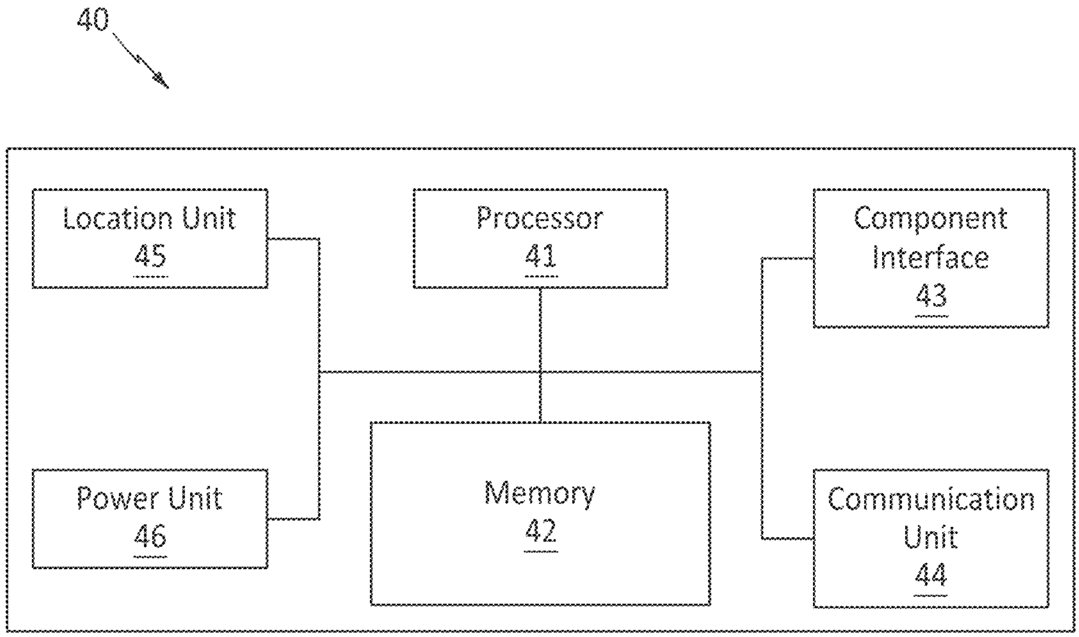
FIG. 4 a simplified block diagram of the system controller of the system, in accordance with one embodiment of the invention.

FIG. 4 is a simplistic block diagram illustrating one embodiment of the system controller 40. In one embodiment, the controller 40 can include a processing unit 41 that is conventionally connected to an internal memory 42, a component interface unit 43, a wireless communication unit 44, a location identification unit 45, and/or a power unit 46.

Although illustrated as separate elements, those of skill in the art will recognize that one or more system components 41-46 may include, comprise, or consist of one or more printed circuit boards (PCB) containing any number of integrated circuit or circuits for completing the activities described herein.

The processing unit 41 can include one or more central processing units (CPU) or any other type of device, or multiple devices, capable of manipulating or processing information such as program code stored in the memory 42 in order to allow the device to perform the functionality described herein.

Memory 42 can act to store operating instructions in the form of program code for the processing unit 41 to execute. Although illustrated in FIG. 4 as a single component, memory 42 can include one or more physical memory devices such as, for example, local memory and/or one or more bulk storage devices. As used herein, local memory can refer to random access memory or other non-persistent memory device(s) generally used during actual execution of program code, whereas a bulk storage device can be implemented as a persistent data storage device such as a hard drive, for example.

The component interface unit 43 can function to provide a communicative link between the processing unit 41 and various system elements such the user interface device 35, the pump 12, valve 14, the slurry generation unit 20, the ratio control valve 16 and generator 17, for example. In this regard, the component interface unit can include any number of different components such as one or more PIC microcontrollers, standard bus, internal bus, connection cables, and/or associated hardware capable of linking the various components.

In one embodiment, the component interface unit can include, or can be connected to one or more cable plugs such as a USB port for example which can function to interface with any number of secondary devices such as external computers or tablets utilized by firefighters in the field.

The wireless communication unit 44 can include any number of components capable of sending and/or receiving electronic signals with another device, either directly or over a network. In one preferred embodiment, the communication unit 44 can include a cellular transceiver capable of connecting the controller to an externally located computer. The communication unit can function to transmit the operating status of the system as well as resource requests such when the water tank 11 levels are low and need to be filled, for example.

Of course, the device is not limited to the use of a cellular transceiver, as other embodiments are contemplated wherein the communication unit 44 includes a different type of transceiver such as Wi-Fi, or Bluetooth transceiver, among others, for example.

The location identification unit 45 can function to provide real time location information (e.g., address, GPS coordinates, etc.) of the system 10 to the external computer system via the wireless communication unit. Such a feature beneficially allows firefighting organizations to know the exact location of their equipment at all times.

In one embodiment, the location module can comprise a discrete GPS transceiver for communicating with a third-party location tracking company that provides location identification and tracking services for registered GPS enabled devices. Alternatively, or in addition thereto, the location unit can utilize or consist of the cellular transceiver that utilizes the commercial cellular location services offered by many different cellular service providers.

The power unit 46 can function to supply the required power to each of the system components. In one embodiment, the power unit can be connected to the electric generator 17 and can further include any number of different transformers and power distribution circuits for ensuring each device receives the power necessary to operate.

In operation, the system 10 can be transported to any location where firefighting services are needed. The tank 11 can be filled with water prior to delivery of the system, or onsite via the receptacle 11*a* from an onsite water source or tanker truck, for example. Next, a user operating the panel 35 can instruct the system to begin generating slurry for use in the firefighting endeavor. The controller 40 can control the operation of the slurry generation unit 20 to create slurry in any number of different consistencies such as an 80% ice and 20% water ratio, for example. As the slurry is produced it will be stored in the tank 28.

A user operating the panel 30 can instruct the system to selectively dispense water from the tank 11, slurry from the slurry generation unit 20, or a combination of both via the pump 12 and ratio control valve 16. In this regard, the ratio control valve can independently open and close the fluid pathways to the tanks 11 and 28, to achieve any ratio of water and slurry to be dispensed by a firefighter via the hose 5 and nozzle 6 that are connected to the panel 30.

In this regard, when the system is used to create a fire barrier, the user will instruct the system to output a higher concentration of slurry such as a pure 80% ice and 20% water from the system. Conversely, when battling a structure fire, the system may output a lower concentration of slurry such as a 16% ice and 85% water ratio. Of course, any number of other ratios may be chosen and output by the system when used in any number of other firefighting situations.

As to a further description of the manner and use of the present invention, the same should be apparent from the above description. Accordingly, no further discussion relating to the manner of usage and operation will be provided.

As described herein, one or more elements of the device 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the term "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A firefighting system, comprising:
a tank that is configured to receive and store water;
a pump that is in fluid communication with the tank;
a water supply valve that is in fluid communication with the pump and the tank;
a slurry generation unit that is in fluid communication with the water supply valve, said slurry generation unit being configured to produce a first ice slurry mixture; and
a pump panel that is in fluid communication with each of an output of the slurry generation unit, and the water supply valve,
wherein the pump panel includes functionality for engaging a hose and nozzle, and
wherein the pump panel includes functionality for selectively discharging each of the first ice slurry mixture, or stored water via the hose and nozzle.

2. The firefighting system of claim 1, wherein the slurry generation unit incudes a thermal energy conversion system that removes a heat from the water supplied by the tank.

3. The firefighting system of claim 2, further comprising:
a slurry tank that is configured to receive and store the slurry produced by the slurry generation unit.

4. The firefighting system of claim 3, wherein a storage area of the slurry tank is thermally insulated.

5. The firefighting system of claim 4, wherein the slurry pump comprises:
a screw pump.

6. The firefighting system of claim 3, further comprising:
a slurry pump that is configured to supply the ice slurry to the pump panel under pressure.

7. The firefighting system of claim 1, further comprising:
a system controller that is configured to control an operation of the pump and the slurry generation unit.

8. The firefighting system of claim 7, further comprising:
a user interface that is connected to the system controller,
wherein the user interface is configured to send and receive operating information with a system user.

9. The firefighting system of claim 7, further comprising:
a generator that is configured to provide power to each of the system controller, the pump, and the slurry generation unit.

10. The firefighting system of claim 1, wherein the pump panel includes at least one gauge for displaying a fluid level of the tank.

11. The firefighting system of claim 1, further comprising:
a ratio control valve having an inlet section that is in fluid communication with each of the output of the slurry generation unit and the water supply valve, and an outlet section that is in fluid communication with the pump panel.

12. The firefighting system of claim 11, wherein the ratio control valve includes functionality for dispensing a second ice slurry mixture to the pump panel.

13. The firefighting system of claim 12, wherein the second ice slurry mixture includes a ratio of water from the water supply valve, and ice from the output of the slurry generation unit.

14. The firefighting system of claim 13, wherein the pump panel includes a functionality for allowing a user to determine the ratio of ice and water in the second ice slurry mixture.

15. The firefighting system of claim 1, wherein the pump and the water supply valve are configured to automatically pump the stored water from the tank to the slurry generation unit upon receipt of a resource request from the slurry generation unit.

* * * * *